United States Patent [19]

Kohzai et al.

[11] 4,379,987
[45] Apr. 12, 1983

[54] SPINDLE ROTATION CONTROL SYSTEM

[75] Inventors: Yoshinori Kohzai; Yoshiki Fujioka, both of Hino, Japan

[73] Assignee: Fujitsu Fanuc Limited, Tokyo, Japan

[21] Appl. No.: 190,659

[22] Filed: Sep. 25, 1980

[30] Foreign Application Priority Data

Oct. 9, 1979 [JP] Japan .................................. 54-130153

[51] Int. Cl.³ ............................................. G05B 13/00
[52] U.S. Cl. .................................. 318/561; 318/571; 318/563; 318/590; 364/474
[58] Field of Search .............. 318/571, 561, 590, 653, 318/592; 364/474, 475

[56] References Cited

U.S. PATENT DOCUMENTS

| | | | |
|---|---|---|---|
| 4,206,392 | 6/1980 | Shimajiri et al. | 318/571 X |
| 4,207,504 | 6/1980 | Kawada et al. | 318/590 |
| 4,288,849 | 9/1981 | Yoshida | 364/474 X |
| 4,305,028 | 12/1981 | Kostas et al. | 318/571 |

Primary Examiner—B. Dobeck
Attorney, Agent, or Firm—Staas & Halsey

[57] ABSTRACT

A system for controlling the rotation of a spindle includes a motor, a speed detecting circuit for detecting the speed of the motor and for producing a signal indicative of the actual speed thereof, a speed control circuit for controlling the motor so as to narrow to zero a deviation between the actual speed thereof and a commanded speed, a spindle driven by the motor, and a position control circuit for producing a position deviation signal on the basis of a commanded stopping position and the rotational position of the spindle. The spindle is rotated at a commanded speed by the speed control circuit and is rotationally controlled by an orientation command signal so as to make the position deviation signal zero. The system further includes a proximity switch, which is mounted on the spindle, for detecting the present rotational position thereof, and for producing a detection signal having a value of zero volts when a predetermined point on the spindle has reached a commanded stopping position, and either a positive or negative value depending upon whether the predetermined point on the spindle is immediately to the left or right of the commanded stopping position. The detection signal from the proximity switch serves as the position deviation signal.

8 Claims, 11 Drawing Figures 4,379,987

SPINDLE ROTATION CONTROL SYSTEM

BACKGROUND OF THE INVENTION

This invention relates to a system for controlling the rotation of a spindle, and more particularly to a spindle rotation control system which is adapted to rotate the spindle of a machine tool at a commanded speed, to stop the spindle at a commanded position with a high accuracy, and to increase the rigidity at which the spindle is held when at rest.

There are machine tools known in the art which have an automatic tool changing function that allows machining to be performed automatically while a variety of tools are changed, also automatically. The tool changing operation proceeds as follows. First, a magazine holding a number of tools is revolved to bring a vacant tool holding portion of the magazine into position directly above a spindle mechanism. The spindle mechanism, which is grasping an old tool to be exchanged for a new one, is then projected forwardly, after which the magazine positioned above the spindle mechanism is lowered to permit the old tool to be received and grasped by the vacant tool holding portion of the magazine. The spindle mechanism is then retracted so that the old tool separates from the spindle, thus transferring the old tool to the magazine. Next, the magazine is revolved to bring a desired new tool into position in front of the spindle, and the spindle mechanism is projected forwardly to receive and grasp the new tool. Finally the magazine is raised away from the spindle to complete the tool change operation.

It is required in the tool change mechanism of the foregoing type that the fitting portions of the spindle and a tool be mated smoothly during the changing of tools. In other words, a predetermined point on the spindle must be stopped accurately at a predetermined rotational position. To this end, machine tools having the conventional automatic tool change function are provided with a photoelectric detector or with a limit switch mechanism for detecting the position of a key on the spindle. The arrangement is such that the spindle is brought to a stop at the predetermined rotational position by the application of a mechanical brake which is actuated in response to a signal from the detecting means. Since this method makes use of the mechanical brake, however, brake shoe wear results after long periods of use so that the spindle eventually cannot be stopped at the predetermined rotational position, thereby giving rise to occasions where the changing of tools cannot be performed smoothly. Avoiding this situation entails troublesome maintenance and inspection work as well as the frequent replacement of parts.

A proposed solution to the above problem is a servo control system that enables the spindle to be stopped accurately at a predetermined rotational position through electrical means without relying upon a mechanical brake. However, since the inertia of the DC motor that drives the spindle is very large, it is necessary to reduce the system gain to maintain system stability (i.e., in order to preclude such phenomena as spindle overshoot and hunting). Since reducing the system gain results in a diminished system stability when the motor is at rest, the DC motor and the spindle connected thereto tend to rotate when any external force or mechanically eccentric load is applied. This alters the position at which the spindle is stopped and prevents tools from being changed smoothly. Furthermore, if the above-mentioned servo system is applied to an apparatus such as a turning center that has a spindle indexing function, the spindle is likely to move during a cutting operation as a result of the low rigidity of the spindle. This makes it impossible to machine a workpiece accurately. It is conventional practice, therefore, to make use of mechanical means such as a pin to prevent spindle rotation, but this complicates both the operating procedure and the mechanism itself. Moreover, if a sensor such as a resolver or position coder is employed as a means for detecting the rotational position of the spindle in the foregoing servo control system, the result is a higher cost since prior art circuits for forming position deviation signals are complicated in construction and raise the total cost of the system.

SUMMARY OF THE INVENTION

Accordingly, it is an object of the present invention to provide a spindle rotation control system which enables a spindle to be stopped at a commanded stopping position with a high accuracy without the use of a mechanical brake, and which permits the spindle to be rotated at a commanded speed.

It is another object of the present invention to provide a spindle rotation control system which enables stability to be maintained during rotation and which, by enhancing rigidity when the spindle is stopped, prevents the spindle from being rotated by an external force or by an eccentric load.

It is a further object of the present invention to provide a structurally simple and inexpensive spindle rotation control system by enabling the utilization of an inexpensive proximity switch as a position detector.

Other features and advantages of the invention will be apparent from the following description taken in conjunction with the accompanying drawings.

DESCRIPTION OF THE PREFERRED EMBODIMENT

Figure 1:
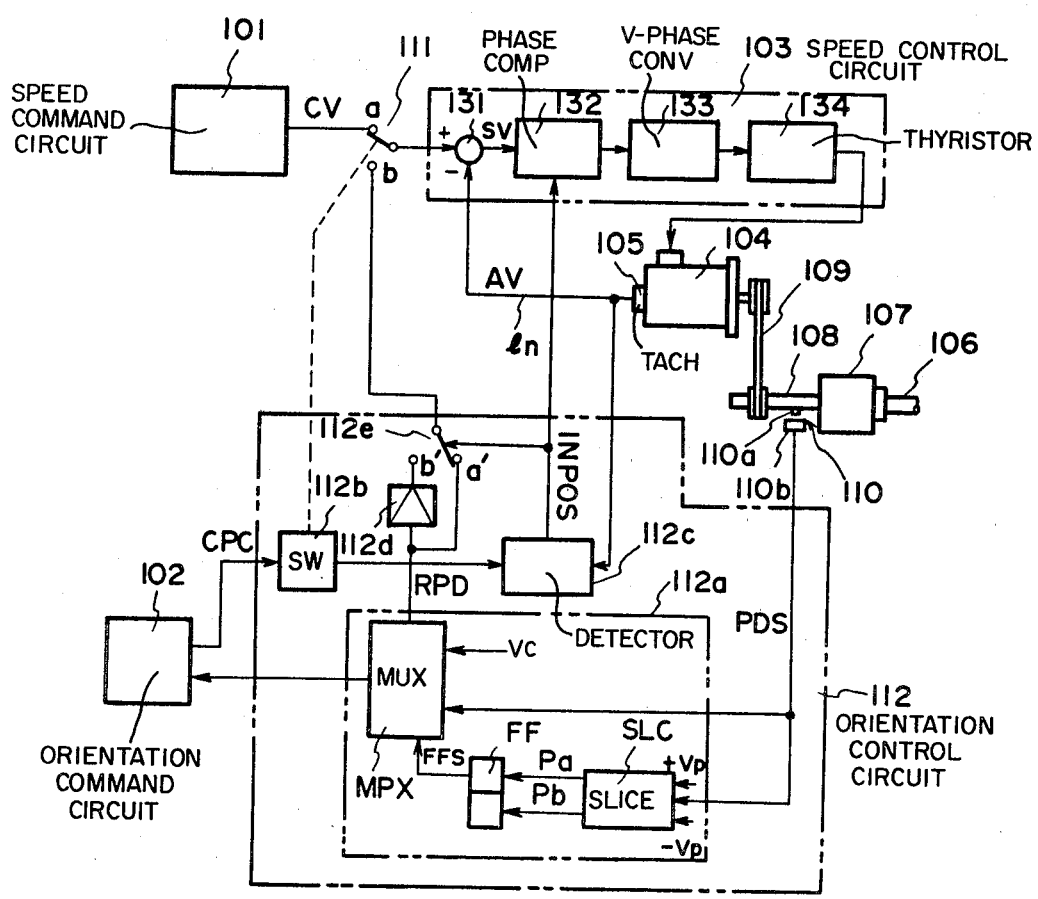
FIG. 1 is a block diagram of a system for controlling the rotation of a spindle in accordance with the present invention.

Referring to FIG. 1, the system of the present invention includes a speed command circuit 101 which produces a command speed signal CV, and an orientation command circuit 102 which produces an orientation command signal CPC. A speed control circuit 103 includes an adder 131, a phase compensating circuit 132, a voltage-to-phase converting circuit 133, and a thyristor circuit 134. The adder 131 is adapted to deliver a difference voltage between the command speed signal CV and the actual speed AV of the motor. The phase compensating circuit 132 subjects the phase of the servo system to phase compensation by advancing or retarding the phase. The voltage-to-phase converting circuit 133 controls the firing angle of each thyristor in the thyristor circuit 134 in accordance with the deviation between the command speed CV and the actual speed AV. The thyristor circuit 134, which includes a plurality of thyristors, operates in accordance with the controlled firing angles of its thyristors to vary the voltage applied to a DC motor 104, thereby to regulate the speed at which the motor rotates. As the motor 104 rotates, a tachometer generator 105 generates a voltage in accordance with the motor speed. Numeral 106 denotes a tool, 107 a spindle mechanism on which the tool 106 is mounted, and 108 a spindle which is coupled to the DC motor 104 via belt (or gears) 109. A proximity switch 110 comprises a magnetic body 110a, a sensing portion 110b, and an electric circuit 110c, as will now be described in greater detail with reference to FIG. 2.

Figure 2A:
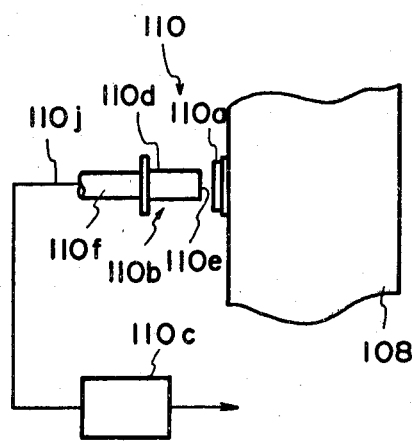
FIGS. 2A–2D are external views of a proximity switch.
Figure 2B:
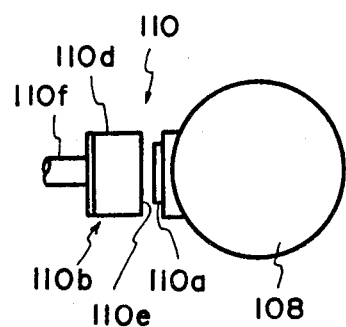
Figure 2C:
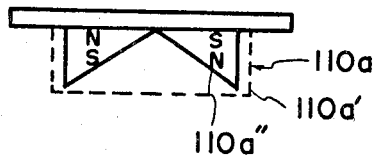
Figure 2D:
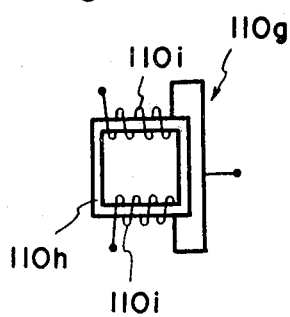

FIG. 2A is a partial front view showing the magnetic body 110a mounted on the spindle 108, and FIG. 2B is a plan view of the same. Fixedly secured in a case 110a' of the magnetic body 110a are permanent magnets 110a" having the polarity shown in FIG. 2C. The sensing portion 110b includes a case body 110d, a detecting surface 110e, and a vinyl cable 110f, the case body 110d accommodating a magnetic circuit 110g for sensing. The magnetic circuit 110g, as shown in FIG. 2D, has a coil 110i wound around a core 110h. The magnetic body 110a is mounted on the spindle 108, and the sensing portion 110b is mounted on a mechanically stationary portion of the equipment.

Figure 3A:
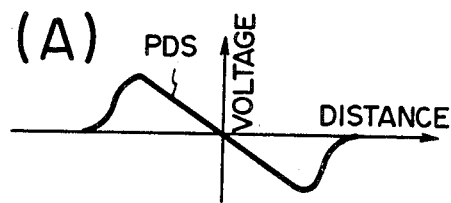
FIGS. 3A–3B are waveform diagrams of the proximity switch output.
Figure 3B:
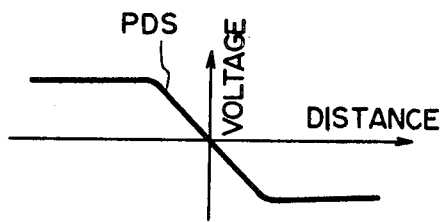

The above-mentioned proximity switch is adapted so that as the spindle rotates, the detection signal PDS having the waveform shown in FIG. 3A is produced at the output terminal 110j of the sensing portion 110b. The detection signal PDS has a value of 0V when the magnetic body 110a confronts the detecting surface 110e, and has positive and negative portions when the magnetic body 110a is on either side of the detecting surfaces 110e, the polarity depending upon the particular side. It should be noted that an arrangement is possible wherein the detection signal PDS can have the waveform shown in FIG. 3B. The magnetic body 110a is mounted on the spindle 108 at an angular position thereof corresponding to the predetermined point which is to be stopped at the commanded stopping position. The sensing portion 110b is mounted at a position corresponding to the commanded stopping position.

Figure 4:
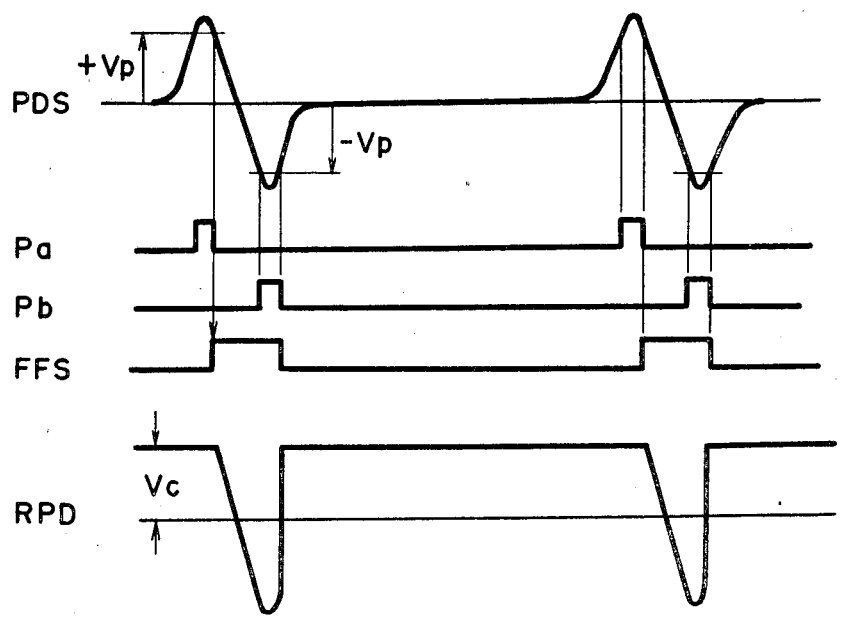
FIG. 4 is a waveform diagram of signals associated with a circuit for generating position deviation signals.

Returning now to FIG. 1, a changeover switch 111 is changed over from the contact a to the contact b by the orientation command signal CPC from the orientation command circuit 102. An orientation control circuit 112 includes a circuit 112a for generating a position deviation signal RPD, a loop changeover circuit 112b which switches the changeover switch 111 from the contact a to the contact b in response to the orientation command signal CPC, a circuit 112c for generating an "in-position" signal INPOS when the actual speed AV drops to zero with the orientation command signal CPC at logical "1", an amplifier 112d for amplifying the position deviation signal RPD, and a changeover switch 112e. The circuit 112a comprises a slicing circuit SLC, a flip-flop FF, and a multiplexer MPX. The slicing circuit SLC receives the detection voltage PDS from the proximity switch 110, and constant voltages $+V_p$, $-V_p$, and is adapted to compare the magnitude of the detection voltage PDS with the levels of the voltages $+V_p$, $-V_p$. Thus the slicing circuit SLC produces a pulse Pa when the detection voltage PDS exceeds $+V_p$, and a pulse Pb when the detection voltage drops below $-V_p$. The pulses Pa, Pb are applied to the respective set, reset terminals of the flip-flop FF, the flip-flop being set by the pulse Pa and reset by the pulse Pb. The set output terminal of the flip-flop delivers a signal FFS, shown in FIG. 4. The multiplexer MPX receives a constant voltage Vc and the detection voltage PDS, and is adapted so as to deliver the signal PDS when the set output FFS is a "1", and the constant voltage Vc when the signal FFS is a "0". Thus, the resulting output of the multiplexer MPX is the position deviation signal RPD shown in FIG. 4.

The operation of the servo system for control of spindle rotation shown in FIG. 1 will now be described with reference to FIG. 5.

During rotation of the spindle the changeover switch 111 is connected to the contact a, so that the adder 131 delivers the difference voltage between the command speed signal CV and the actual speed signal AV. The difference voltage is applied to the voltage-to-phase converting circuit 133 through the phase compensating circuit 132. The voltage-to-phase converting circuit 133 controls the firing angle of the thyristor circuit 134 in accordance with the value and polarity of the difference voltage, thereby varying the voltage applied to the DC motor 104 in such a manner that the actual speed AV of the DC motor is brought into coincidence with the command speed CV. The system continues operating in this fashion, the DC motor 104 rotating at the command speed as a result. It should be noted that the speed control circuit 103, DC motor 104, tachometer generator 105 and a line in form a speed control feedback system.

Figure 5:
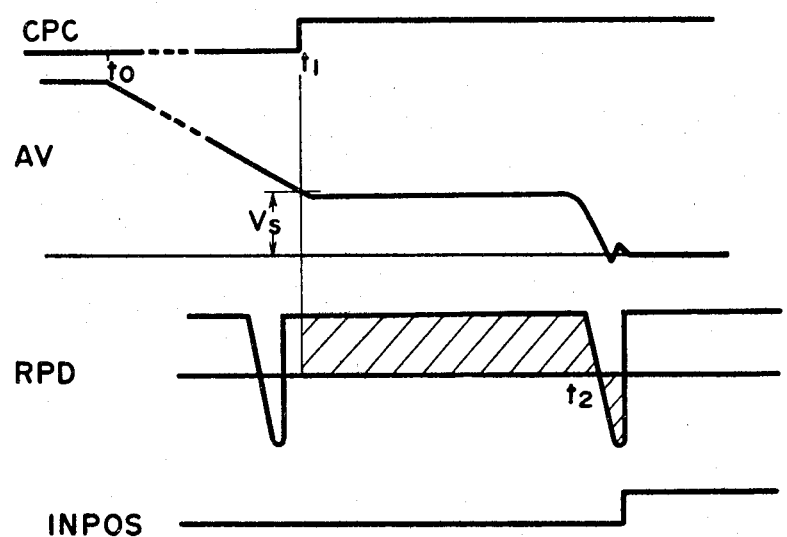
FIG. 5 is a waveform diagram of signals associated with the block diagram of FIG. 1.

When a machining operation is completed and it is necessary to change tools, the orientation command circuit 102 issues the orientation command signal CPC at time $t_0$, as shown in FIG. 5. As a result, the command speed signal CV from the speed command circuit 101 gradually decrease toward zero, so that the actual speed AV of the spindle begins decreasing, as shown in FIG. 5. Then, at a predetermined time, such as the time $t_1$ at which the actual speed AV reaches a predetermined speed Vs, the loop changeover circuit 112b switches the changeover switch 111 from the side a to the side b, thereby initiating the operation of a position control feedback system. The output of the adder 131 is now difference voltage between the position deviation signal RPD and the actual speed signal AV, so that the speed of the DC motor 104 is controlled to reduce the difference voltage to zero, in approximately the same manner as performed by the speed control loop described above. The hatched portion of the position deviation signal RPD is applied to the adder 131 from time $t_1$, as shown in FIG. 5. The position deviation voltage RPD begins decreasing, along with the actual speed AV, when the magnetic body 110a of the proximity switch 110 approaches the sensing portion 110b. Though the magnetic body 110a confronts the sensing portion 110b at time $t_2$, the considerable inertia possessed by the DC motor 104 causes the magnetic body to pass slightly beyond the sensing portion 110b, which is at the commanded stopping position. At this time the position deviation voltage RPD is negative, so that the DC motor 104 now reverses direction and returns the magnetic body to the position of the sensing portion 110b.

The magnetic body 110a eventually comes to rest at the position confronting the sensing portion 110b, thereby completing the controlling operation for stopping the spindle at the predetermined rotational position.

When the DC motor 104 comes to rest, the in-position signal generating circuit 112c detects that the actual speed signal AV has dropped to zero volts. When this is detected the circuit 112c generates the in-position signal INPOS, thereby switching the changeover switch 112c to the side b' and raising the gain of the phase compensating circuit 132. This operation raises the gain of the position control loop.

Figure 6:
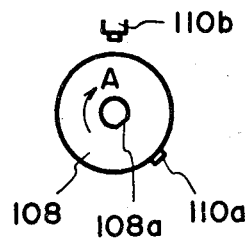
FIG. 6 is an illustrative view for describing how the rotational position of a spindle is controlled when the spindle is at rest.

Described above is the orientation control operation which starts when the spindle is rotating and which ends when the spindle comes to rest. Controlling the orientation of the spindle when it is already at rest is executed in almost the same manner as performed after time $t_1$ as shown in FIG. 5. More specifically, if the spindle 108 has the orientation shown in FIG. 6 when the orientation command signal CPC is generated, the spindle 108 is rotated in the direction of the arrow A and comes to rest with the magnetic body 110a confronting the sensing portion 110b. Numeral 108a in FIG. 6 denotes an orientation portion.

Figure 7:
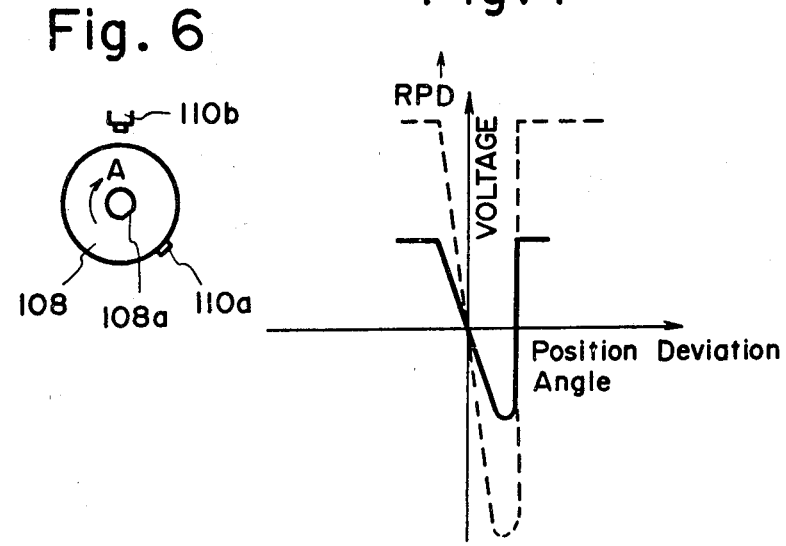
FIG. 7 is a graph showing the relation between position deviation voltage and position deviation angle when the gain is switched.

In the graph of FIG. 7 which shows the relation between the position deviation voltage RPD and the position deviation angle in connection with the position control system, the solid line indicates the case for a low gain, and the dotted line the case for high gain. In other words, the higher the gain, the greater the voltage value of RPD and hence, the greater the armature current (torque) of the DC motor 104. This increases the rigidity at which the spindle is held when the motor is at rest.

In accordance with the present invention as described above, a spindle can be stopped at a commanded stopping position with a high accuracy without relying upon a mechanical brake, thus enabling a smooth tool change operation. It is also possible to rotate the spindle accurately at the commanded speed. Furthermore, by reducing the gain during spindle rotation and raising the gain when the spindle is at rest, stability is maintained in the former state and rigidity in the latter. Therefore the stationary spindle will not have a tendency to rotate due to an external force or eccentric load. Moreover, since an inexpensive proximity switch can be employed as a position detector, the overall structure is simplified and the total cost reduced.

Although the invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A system for controlling the rotation of a spindle, comprising:
   means for providing an orientation command signal;
   a motor;
   speed detecting means, operatively connected to said motor, for detecting the speed of said motor and for generating a signal representing the actual speed of said motor;
   a speed control circuit, operatively connected to said speed detecting means and said motor, for controlling said motor so as to narrow to zero a deviation between the actual speed thereof and a commanded speed;
   a spindle driven by said motor; and
   a position control circuit, operatively connected to said spindle and said speed control circuit, for generating a position deviation signal on the basis of a commanded stopping position and the rotational position of said spindle;
   said spindle being rotated at a commanded speed by said motor under the control of said speed control circuit, and rotationally controlled by the orientation command signal so as to make the position deviation signal zero;
   said position control circuit including a proximity switch, mounted on said spindle, for detecting the present rotational position of said spindle, for generating a detection signal having a value of zero volts when a predetermined point on said spindle has reached a commanded stopping position, and for generating either a positive or negative value depending upon whether the specified point on said spindle is immediately to the left or right of the commanded stopping position, said position control circuit generating the position deviation signal in dependence upon the detection signal.

2. The system according to claim 1, further comprising first means for providing a predetermined voltage $V_c$, wherein said position control circuit further comprises a waveform synthesizing circuit, operatively connected to said proximity switch and said first means, for providing, as the position deviation signal, the predetermined voltage $V_c$ until the output of said proximity switch reaches a first peak, and for providing, as the position deviation signal, the detection signal from said proximity switch from the time of said first peak until the time at which the output of said proximity switch reaches a second peak.

3. The system according to claim 2, wherein said position control circuit further comprises a slicing circuit, operatively connected to said proximity switch and said waveform synthesizing circuit, for comparing the voltage level of the detection signal from said proximity switch with a constant positive voltage level and with a constant negative voltage level, said waveform synthesizing circuit operating in accordance with the output of said slicing circuit.

4. The system according to claim 1 or 2, further comprising a detecting and amplifying circuit, operatively connected to said position control circuit and said speed control circuit, for amplifying the position deviation signal when the speed of said motor has reached zero.

5. A system for controlling the rotation of a spindle, comprising:
   first means for providing a speed command signal;
   second means for providing an orientation command signal;
   a motor for driving the spindle;
   third means, operatively connected to said motor, for detecting the speed of said motor and for generating an actual speed signal;
   fourth means, operatively connected to said second means and said motor, for generating a position deviation signal representing the difference between a commanded stopping position and the actual rotational position of the spindle, said fourth means comprising:
   a proximity switch, positioned adjacent to the spindle, for detecting the present rotational position of the spindle and for generating a detection signal;

a position deviation signal generator circuit, operatively connected to said proximity switch, for receiving said detection signal and for generating a deviation signal, said position deviation signal generator comprising:
  a slicing circuit operatively connected to said proximity switch;
  a flip-flop operatively connected to said slicing circuit;
  means for providing a reference voltage; and
  a multiplexer, operatively connected to said flip-flop, said proximity switch, and said means for providing a reference voltage, for providing, as said deviation signal, one of said reference voltage and said detection signal, in dependence upon the output of said flip-flop;
detection means, operatively connected to said second means and said third means, for receiving said actual speed signal and said orientation command signal and for generating an in position signal; and
amplifier means, operatively connected to said detection means, said switching means and said multiplexer, for providing, as said position deviation signal, one of said deviation signal and an amplified deviation signal, in dependence upon said position in signal;
switching means, operatively connected to said first means, said second means and said amplifier means, for providing, as an output, one of said speed command signal and said position deviation signal in dependence upon said orientation command signal; and
fifth means, operatively connected to said switching means, said third means and to said motor, for receiving the output of said switching means and said actual speed signal and for generating a motor drive signal to drive said motor at a commanded speed.

6. The system according to claim 5, wherein said proximity switch comprises:
  a magnetic body mounted on the spindle, said magnetic body comprising a case for holding a plurality of permanent magnets; and
  a magnetic sensing circuit, positioned adjacent to spindle, for detecting the position of said magnetic body and for generating said detection signal.

7. The system according to claim 5, wherein said fifth means comprises a speed control circuit comprising:
  an adder, operatively connected to said switching means and said third means, for generating a difference signal equal to the difference between the output of said switching means and said actual speed signal;
  a phase compensation circuit, operatively connected to said adder and to said detection means, for providing a compensated difference signal;
  a voltage to phase conversion circuit, operatively connected to said phase compensation circuit, for generating a firing signal; and
  a thyristor circuit, operatively connected to said voltage to phase conversion circuit and to said motor, for varying the voltage applied to said motor in dependence upon said firing control signal.

8. A system for controlling the rotation of a spindle, comprising:
  first means for providing a speed command signal;
  second means for providing an orientation command signal;
  a motor for driving the spindle;
  third means, operatively connected to said motor, for detecting the speed of said motor and for generating an actual speed signal;
  fourth means, operatively connected to said second means and said motor, for generating a position deviation signal representing the difference between a commanded stopping position and the actual rotational position of the spindle, said fourth means comprising:
    a proximity switch, positioned adjacent to the spindle, for detecting the present rotational position of the spindle and for generating a detection signal;
    a position deviation signal generator circuit, operatively connected to said proximity switch, for receiving said detection signal and for generating a deviation signal;
    detection means, operatively connected to said second means and said third means, for receiving said actual speed signal and said orientation command signal and for generating an in position signal; and
    amplifer means, operatively connected to said detection means, said switching means and said position deviation signal generator circuit, for providing, as said position deviation signal, one of said deviation signal and an amplified deviation signal in dependence upon said in position signal;
  switching means, operatively connected to said first means, said second means and said amplifier means, for providing, as an output, one of said speed command signal and said position deviation signal in dependence upon said orientation command signal; and
  fifth means, operatively connected to said switching means, said third means and to said motor, for receiving the output of said switching means and said actual speed signal and for generating a motor drive signal to drive said motor at a commanded speed, said fifth means comprising a speed control circuit including:
    an adder, operatively connected to said switching means and said third means, for generating a difference signal equal to the difference between the output of said switching means and said actual speed signal;
    a phase compensation circuit, operatively connected to said adder and to said detection means, for providing a compensated difference signal;
    a voltage to phase conversion circuit, operatively connected to said phase compensation circuit, for generating a firing signal; and
    a thyristor circuit, operatively connected to said voltage to phase conversion circuit and to said motor, for varying the voltage applied to said motor in dependence upon said firing control signal.

* * * * *